Feb. 27, 1934.   J. E. POINTON ET AL   1,948,870
MOLD ACTUATING MECHANISM
Filed Aug. 11, 1932   2 Sheets-Sheet 2
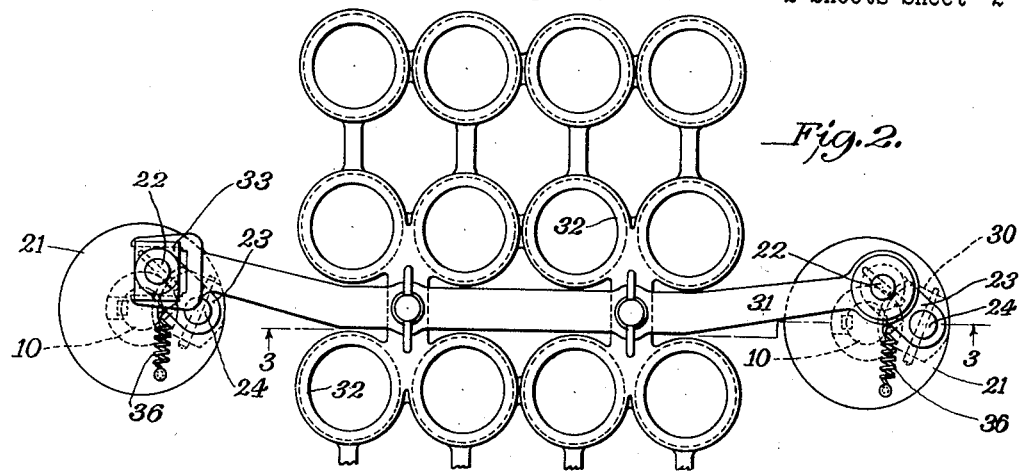
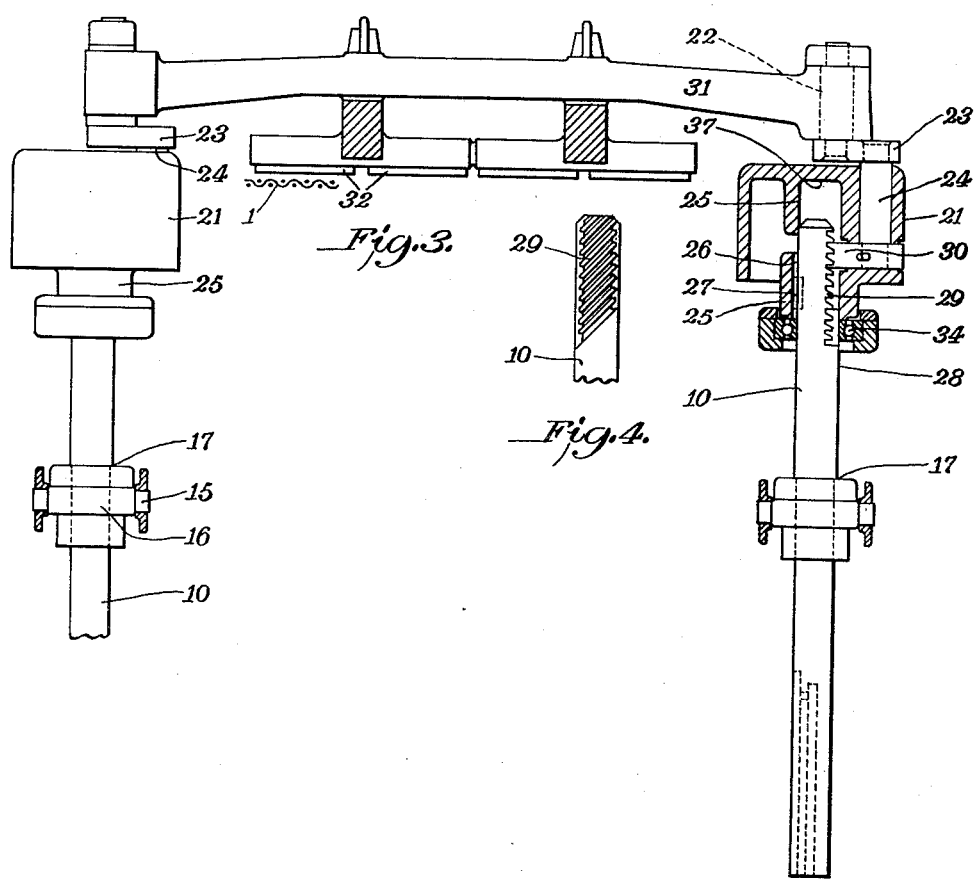
INVENTORS
JOHN EDWARD POINTON
LAURENCE SEYMOUR HARBER
BY *George B Willcox*
ATTORNEY Patented Feb. 27, 1934

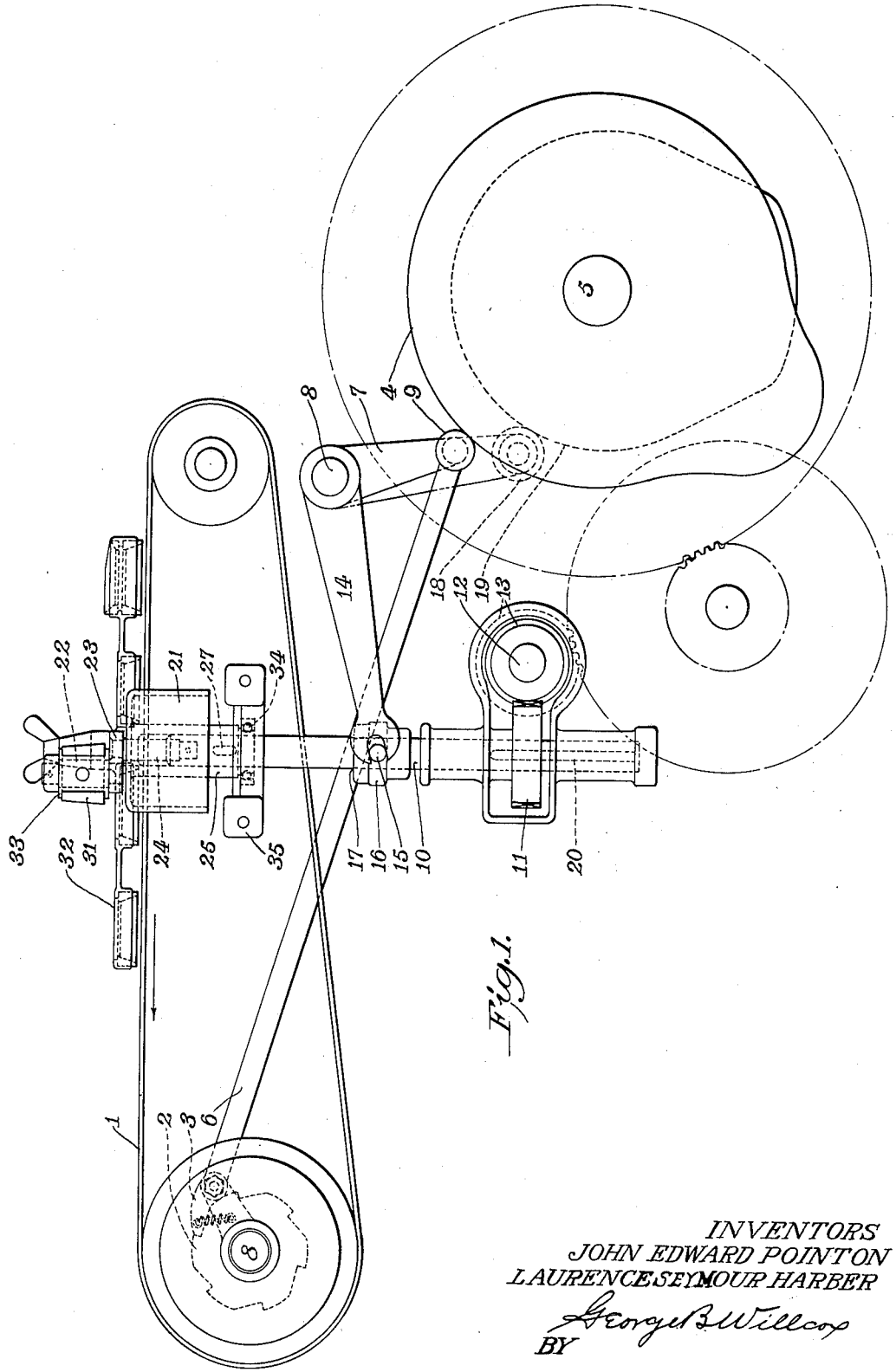

1,948,870

UNITED STATES PATENT OFFICE

1,948,870

MOLD ACTUATING MECHANISM

John Edward Pointon and Laurence Seymour Harber, Westwood Works, Peterborough, England, assignors to Baker Perkins Company, Inc., Saginaw, Mich., a corporation of New York Application August 11, 1932, Serial No. 628,375
In Great Britain August 12, 1931

7 Claims. (Cl. 107—9)

This invention relates to dough molding machines or devices of the kind adapted to mold plastic pieces into ball or sphere-like formation by the employment of a series of molding cups or rings, designated as balling elements, which are given orbital balling movements of variable amplitude about the axis of each cup. A work piece supporting surface is positioned opposite the balling elements and has means for periodically advancing stepwise. This surface is associated with the balling elements to remove the balled material.

The object of the present invention is to provide improved and simplified mechanism for imparting balling motion, whereby the cups are accelerated quickly to their maximum rotary movement and upon termination of the treatment are brought to rest gradually so that the molded balls may lie approximately in the center of the cups.

In association with a crank mechanism having an indirectly mounted crank pin, we provide a rotary shaft reciprocable lengthwise periodically during its rotation and also a variable throw crank rotatable with the shaft and operatively connected with the balling elements for imparting orbital movements thereto. The crank mechanism also includes cup displacement means actuated by the shaft during a part of its reciprocation and adapted to move said cups or balling elements lengthwise of their axes alternately into close proximity with said supporting surface and then away from it to clear the pieces of balled material.

Associated with the variable throw crank and periodically actuated by the shaft during a further part of its endwise reciprocation is a throw-varying mechanism that operates to subject the balling elements to orbital movements of varying amplitude in appropriately timed relation to their periodic axial displacement.

The rotation of the supplemental crank pin carrying element may be effected by a skew gear drive from the crank shaft.

According to another feature, in a molding machine comprising a series of rings or cups to which a balling motion is imparted through adjustable crank mechanism, the axial displacement of the crank shaft may be utilized to effect the adjustments of the throw of the crank and also to vertically displace the molding cups during the stepwise movement of the conveyor band that carries the dough pieces.

With the foregoing and certain other objects in view which will appear later in the specification, the invention is found in the novel construction, arangement and combination of means illustrated in some of its embodiments in the accompanying drawings and particularly pointed out in the appended claims.

In the accompanyng drawings which illustrate the application of the invention to a dough molding machine in which the dough pieces are supported upon a conveyor band and are engaged by molding rings or cups to which a balling motion is imparted:

Figure 1 is a side elevation.

Figure 2 is a plan view, broken away in part.

Figure 3 is a transverse section on line 3—3, Fig. 2, showing the details of the crank mechanism, and Figure 4 is a detail of the crank shaft.

In carrying the invention into effect according to one convenient mode as in a dough molding machine of the kind described, the dough pieces are carried upon a conveyor band 1. The band is given intermittent movement by means of a suitable ratchet drive 2, the pawl 3 of which is oscillated by any suitable means, such as, for example, a rotary cam 4 on a shaft 5, the movement being transmitted through a link 6 coupled to an arm 7 which is pivoted on a shaft 8, the arm carrying a roller 9 engaging the cam 4. A pair of parallel crank shafts 10, 10 is provided, one on each side of the conveyor band 1, the shafts being driven synchronously through gears 11 from a common horizontal shaft 12 which is mounted beneath the conveyor band and carries drive gears 13. The crank shafts 10 are adapted to be actuated longitudinally by means of bell crank levers 14 arranged one at each side of the machine and pivotally mounted on the shaft 8. An arm of each bell crank lever 14 is bifurcated and slotted at its end to engage pins 15 that are carried by a sleeve 16 which surrounds the shaft 10 and abuts against a shoulder 17 thereon. The other arms of the bell crank levers 14 are provided with rollers 18 which engage suitable rotary cams 19 mounted on the shaft 5.

Instead of cams at each side of the machine a single cam may be provided and the bell crank levers may be rigidly fixed upon the horizontal shaft 8, there being only one roller in engagement with the cam 19.

The crank shafts 10 have keyways 20 near their ends into which keys carried by the gears 11 engage so as to permit relative movement between the shafts 10 and the gears 11.

The cams 19 are preferably shaped so that the upward movement of the shafts 10 is at a slower rate than the downward movement.

At the upper end of each crank shaft 10 is a crank disc or bearing member 21 which supports a crank pin 22 that is radially adjustable relatively to the disc. The crank pin 22 is carried by a movable crank arm 23 substantially equal in length to the distance between the axis of the crank shaft 10 and a pintle 24 to which arm 23 is fixed. Pintle 24 is mounted to oscillate in the bearing member 21 so as to sweep the arm 23 through an arc. The crank pin 22 which connects the cup-carrying structure thus may occupy a central position where its axis is aligned with the axis of the crank shaft 10, so that there will be no orbital movement of the cups.

Each crank disc or bearing member 21 is preferably fitted to permit relative axial movement of the crank shaft 10 while the shaft maintains a rotary driving connection with the bearing member. For this purpose the bearing member 21 is provided with a tubular sleeve 25 in which the end of the crank shaft 10 fits. The sleeve is slotted at 26 and a key 27 carried by the crank shaft engages the slot, so that while the crank shaft 10 is rotating it can also move endwise in member 21.

Referring to Figs. 3 and 4, the upper end of each crank shaft 10 on the side 28 facing the arm pintle 24, is formed as a rack, its teeth 29 being preferably at an angle of about 45 degrees. Meshing with these teeth 29 is a toothed quadrant 30 fixed upon the lower end of pintle 24, the bearing member 21 being suitably cut away to accommodate the toothed quadrant.

The crank pins 22 on arms 23 extend upwardly and carry a cross-head 31 that extends across the conveyor band 1 and supports a series of rows of molding cups or rings 32.

The cross-head is provided near one end with an aperture into which the crank pin 22 fits to provide a driving connection. The other end is slotted to receive a bearing block 33 which is capable of sliding movement in the slot.

The upper ends of the shafts 10 are guided by ball races 34 that are carried by brackets 35 fixed upon the frame of the machine, not shown.

Divided dough pieces are fed into the first row of molding rings 32 by any suitable means, as a dividing and transferring apparatus such as is described in our co-pending application, Serial No. 628,374, filed August 11, 1932.

In operation, at the commencement of a balling motion the crank pins 22 are normally positioned in alignment with the axes of the crank shafts 10. With the parts in this position no orbital or balling movement is imparted to the cross-head 31 or to the molding rings carried thereby, the crank pins 22 simply rotating within their bearings in the cross-head. Cam 19, giving a downward movement to crank shafts 10 relatively to the bearing member 21, the pintles 24 and quadrants 30 are caused, by the teeth 29, to rotate and thus move the crank pins 22 to positions offset from the axes of their respective crank shafts 10. Rotation of the crank shafts 10 will then produce orbital movements of the crank pins 22, which movements are imparted through the cross-head 31 to the balling rings 32.

It is preferable that this radially outward displacement or offsetting of the crank pins 22 shall take place very quickly, and the cams 19 are appropriately shaped for this purpose. At the end of the balling operation a slow upward movement is imparted to the crank shafts 10 relatively to the crank discs or bearing members 21, and the crank pins 22 are thereby returned slowly inwardly to their original concentric or non-orbital positions. Such inward return movements may be aided by springs 36 attached to the crank arms 23 and to the corresponding crank disc 21. When the crank pins 22 are at the inner concentric positions the upper ends of the longitudinally moving crank shafts 10 come into contact with the end walls 37 of the recesses in the sleeves 25 in which they are housed. Continued vertical movement of the crank shafts will raise the crank disc 21 and the cross-head 31 together with the balling cups 32 clear of the dough pieces. The conveyor band 1 will then be stepped by ratchet 2 to bring the dough pieces that had been treated by one row of cups into position for treatment by the next row, and so on. When in their lower positions the crank discs or bearing members 21 abut against suitable stops, preferably the inner members of ball races 34 in which the crank shafts 10 are guided.

Although the invention has been described in connection with the molding of dough it is to be understood that the improved adjustable crank mechanism may be applied in other arts. Obviously the crank shafts may be mounted in various positions other than vertical as here shown, to suit the requirements of service. In such case spring or equivalent means may be provided to return the crank discs 21 to their initial axial position.

It is now evident that in the embodiment of our invention herein shown the shaft revolves continuously and has intermittent lengthwise reciprocating movement. At the bottom of its travel the cups are in close proximity to the belt surface to produce maximum balling action on the dough piece.

During the first part of the upward movement of the shaft balling action decreases from maximum to zero and when the shaft is approximately half way up and the cups are still at the surface of the belt the balling action becomes zero.

During the second part of the upward movement of the shaft the cups rise from the belt with zero balling action and when the shaft arrives at the top of its travel the cups are clear of the belt surface, without any balling action.

During the first part of the return or downward movement of the shaft the cups are stationary and are lowered to the belt.

During the last part of the shaft's downward movement the cups remain close to the belt and balling action begins, increasing from zero, and reaching its maximum at the end of the downward travel of the shaft.

During the rising or return movements of the balling elements 32 occurs the stepwise travel of the belt 1.

Obviously, the sequence and timed relationships of these various movements may be changed somewhat by suitably altering the proportions of the actuating elements, and such changes can be made without departing from our invention as set forth in certain of the claims.

In the appended claims we have pointed out the essential elements of our invention, it being understood, however, that the claims are not intended to be limited to the form of the parts illustrated and described further than a limitation to the described form is necessary to distinguish them from the prior art.

Having thus described our invention, what we claim and desire to secure by Letters Patent is:

1. A balling machine including a rotary drive shaft and a variable throw crank disc associated therewith adapted to impart orbital and lifting movements to balling elements, said machine having, in combination, means imparting endwise reciprocating movement to said drive shaft during its rotation, a portion of the shaft being formed with angularly disposed teeth, a tubular sleeve integral with the crank disc and splined to said shaft for relative endwise movement, and an abutment member on said sleeve adapted to be engaged by an end of the shaft during a part of its endwise travel, said disc and sleeve being recessed, a toothed quadrant pivotally mounted within the recess and forming, together with the angular teeth of the shaft a skew gear actuated by endwise movements of the shaft, means connecting said quadrant operatively to said balling elements for varying their orbital movements, said means comprising a crank arm connected to the quadrant and a wrist pin on said arm pivoted to a cross-head upon which said elements are mounted.

2. In a dough piece former having balling rings mounted for orbital movement, a drive shaft for said rings, means for rotating the shaft, and means for imparting endwise reciprocating movements to the shaft during its rotation, a portion of the shaft formed with teeth, a crank disc having a sleeve splined to said shaft and having an abutment member in the path of endwise movement of the shaft, a toothed quadrant pivotally mounted in a recess provided in said disc and meshing with the teeth of said shaft within the sleeve to present a skew gear operative during the endwise movement of the shaft, a crank arm carried by said disc and rotatable relative to said disc by said quadrant, a wrist pin on said arm operatively connected to said balling rings, a fixed support presenting a rest for said disc and a spring return element connecting said crank arm and said disc.

3. A balling machine wherein a rotary drive shaft and a variable throw crank disc rotatable therewith co-operate to impart orbital and lifting movements to balling means, there being a sleeve on the disc splined to the shaft for relative endwise movement and an abutment member associated with the sleeve and positioned to be engaged by the shaft for lifting the disc and the balling means, such machine having, in combination, means for imparting endwise reciprocating movements to said drive shaft during its rotation, a portion of the shaft formed with angularly disposed teeth, said disc and sleeve being formed with a recess, a toothed quadrant pivotally received in said recess and constituting, together with said angular teeth on the shaft, a skew gear oscillatable by the shaft during its endwise movements, operative connections from said pivoted quadrant to said balling means for effecting variations of their orbital movements.

4. In a balling machine having balling means and a crank shaft operatively connected with said balling means to impart oscillatory motion thereto, in combination, means for imparting endwise reciprocating movements to a drive shaft during its rotation, teeth angularly disposed on the shaft, a toothed quadrant meshing, together with said angular teeth, and oscillatable by the shaft during its endwise movements, and connections from said quadrant to the balling elements of the machine operative to vary the orbital movements of said elements.

5. A machine for molding material pieces including balling cups operable by a crank and pin arrangement for imparting to the cups variable oscillatory movement and lifting and lowering movements, said machine including in combination a unitary drive shaft which is both rotatable and longitudinally reciprocable, said shaft having an end portion formed to operatively engage said crank to turn it during a portion of each longitudinal movement of the shaft, whereby oscillatory movement of the crank pin toward and away from the axis of said shaft is effected, a bearing member supporting the crank and cups, said member being rotatable with and longitudinally slidable on the shaft and having an abutment arranged in the path of longitudinal movement of the drive shaft for engagement by the end thereof when nearing the extremity of its longitudinal movement, raising and lowering devices for the drive shaft, the arrangement being such that the shaft, while being partly raised, moves the crank pin into axial alinement with said shaft, whereupon the end of the shaft engages the abutment and by its further longitudinal movement lifts the bearing member and associated balling cups.

6. A machine for molding material pieces, including balling cups operable by a crank and pin arrangement adapted to impart variable oscillatory movements and lifting and lowering movements thereto, said machine including in combination, a unitary drive shaft which is both rotatable and longitudinally displaceable, having an end shaped to operatively engage said crank so as to oscillate it during a portion of the upward longitudinal movement of the shaft whereby the crank pin is moved toward the axis of the shaft, a bearing member for the crank and cups, said bearing member being rotatable with and longitudinally slidable on the shaft and including an abutment arranged in the path of upward movement of the drive shaft for engagement by the end thereof when approaching the extremity of said upward movement, and means for rotating and for longitudinally displacing the drive shaft.

7. A balling machine including, in combination, balling means, means for imparting orbital movement to said balling means, including an adjustable throw crank member, a rotary shaft for rotating said crank member, means for imparting to said shaft timed axial reciprocation during its rotation, means on the shaft in operative engagement with the crank member for adjusting its throw in response to axial reciprocation of said shaft.

JOHN EDWARD POINTON.
LAURENCE SEYMOUR HARBER.